United States Patent [19]

Grundmann et al.

[11] 4,265,806

[45] May 5, 1981

[54] FLAME RETARDANT THERMOPLASTIC SYNTHETIC RESIN

[75] Inventors: Raban Grundmann; Günther Maahs, both of Marl, Fed. Rep. of Germany

[73] Assignee: Chemische Werke Huls Aktiengesellschaft, Marl, Fed. Rep. of Germany

[21] Appl. No.: 167,599

[22] Filed: Jul. 11, 1980

[30] Foreign Application Priority Data

Jul. 13, 1979 [DE] Fed. Rep. of Germany ....... 2928349

[51] Int. Cl.³ ........................... C08F 9/65; C08K 5/34
[52] U.S. Cl. ............................ 260/45.8 NT; 252/8.1; 260/45.7 P; 260/45.8 NE; 260/45.9 NP; 260/DIG. 24; 521/85; 521/907; 544/195
[58] Field of Search .................... 252/8.1; 260/45.7 P, 260/45.8 NT, 45.8 NP, 45.8 NE, DIG. 24; 521/85, 907; 544/195

[56] References Cited

U.S. PATENT DOCUMENTS 4,010,137   3/1977   Brady ........................... 260/45.8 NT

*Primary Examiner*—Morton Foelak
*Attorney, Agent, or Firm*—MIllen & White

[57] ABSTRACT

A process for producing a solid, intumescent, phosphorus-containing flame retardant for thermoplastic synthetic resins, comprises evaporating to dryness the reaction product of (a) 1 mole of phosphoric acid, phosphorous acid or polyphosphoric acid, (b) 0.5–2 moles of ethylene oxide or glycol, and (c) 0.2–1 mole of melamine, and tempering the thus-obtained solid at 100°–250° C. The product so obtained can be added to such resins to render them flameproof without deleterious side effects such as discoloration.

7 Claims, No Drawings

FLAME RETARDANT THERMOPLASTIC SYNTHETIC RESIN

BACKGROUND OF THE INVENTION

The present invention relates to the manufacture and use of solid, intumescent, phosphorus-containing flame retardants.

Intumescent agents have a flame-retarding effect in that under more intense heat, for example, under the effect of a fire, they expand into a heat-insulating, low-flammability coke layer. Thus, they suppress, inter alia, the dripping of molten, possibly burning material.

Intumescent flame-retarding systems are known, especially for painting compositions and coatings. In certain individual cases, such systems are also utilized in thermoplastic polymers. In general, the intumescent mixture consists of the following components:
(a) a salt of phosphoric or polyphosphoric acid (for example, ammonium phosphate),
(b) a polyhydroxy compound (e.g., pentaerythritol),
(c) a nitrogen compound (e.g., melamine), and
(d) optionally, a halogen compound (e.g., chloroparaffin).
(See, e.g., D. G. Brady, J. Fire Retard. Chem., 4 [1977] 3: 150.)

Intumescent coating compounds based on ammonium polyphosphate are disclosed, for example, in DOS's [German Unexamined Laid-Open Applications] Nos. 1,794,343 and 2,359,699. Because of their use of an inorganic polyphosphate, however, such compositions exhibit disadvantages when mixed with thermoplastics and lead to poor physical properties of the resultant synthetic resin. The flame-retardant mixtures for polypropylene proposed in DOS No. 2,800,891 likewise contain ammonium polyphosphate or aminophosphates and, thus, are burdened by the same deficiencies.

DOS No. 2,506,096 describes the treatment of cellulosic material with the reaction products of aqueous phosphoric acid and ethylene oxide. These are neutralized and applied to the cellulose in the dissolved condition. Such solutions, or also concentrated oily or viscous masses made therefrom, are unsuitable for thermoplastic processing. In particular, their water solubility constitutes a special disadvantage since the agent, in the presence of water, is removed to the greatest degree from the marginal layers wherein it is especially to be effective.

In contrast thereto, U.S. Pat. No. 4,010,137 describes flame-retardant compositions, for example, of polypropylene, which contain a mixture, prepared at an elevated temperature, of polyphosphoric acid, pentaerythritol and melamine. However, this flame retardant must be produced under considerable mechanical agitating power in the melt at temperatures of up to 250° C. A further disadvantage is that the product must additionally be thermally degassed to be able to be incorporated into the synthetic resins using the customary processing temperatures without danger of foaming. In this treatment, the agent not only loses a substantial part of its actually desirable foamability, but also loses its white color and becomes yellowish to brown.

Therefore, there is still a need for an intumescent flame-retardant formulation for thermoplastic synthetic resins, such as polypropylene, distinguished by an easy method of manufacture, and by possession of the properties of being colorless, conveniently incorporable into polymeric compositions, compatible, and highly efficacious as a flame retardant, all at the same time.

SUMMARY OF THE INVENTION

Accordingly, it is an object of this invention to provide such an intumescent flame retardant having such properties.

Upon further study of the specification and appended claims, further objects and advantages of this invention will become apparent to those skilled in the art.

These objects have been attained by the surprising finding that it is possible to convert the reaction products of phosphoric acid or phosphorous acid with ethylene oxide, consisting possibly predominantly of esters of the formula

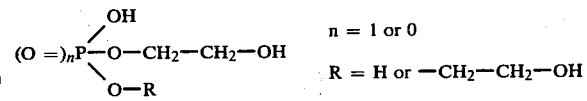

$$n = 1 \text{ or } 0$$
$$R = H \text{ or } -CH_2-CH_2-OH$$

together with melamine, into hard-to-dissolve solids forming an excellent flame-retarding effect as well as good compatibility with thermoplastic synthetic resins.

Thus, this invention relates to a process for producing a solid, intumescent, phosphorus-containing flame retardant for thermoplastic synthetic resins, comprising evaporating to dryness the reaction product of (a) 1 mole of phosphoric acid, phosphorous acid or polyphosphoric acid, (b) 0.5–2 moles of ethylene oxide or glycol, and (c) 0.2–1 mole of melamine, and tempering the thus-obtained solid at 100°–250° C.

DETAILED DISCUSSION

The reduction of the water solubility of these esters when heating them with melamine and the improvement in the flame-retarding effect when using glycol as the hydroxy component (for example, as compared to the heretofore preferred pentaerythritol) must be considered surprising and inventive. Heretofore, the opinion prevailed, especially with respect to the hydroxy component, that this component should, if at all possible, constitute a higher-molecular weight compound, such as dipentaerythritol, sugar or starch.

A great variety of possibilities exist for the manufacture of the acidic phosphoric acid esters. Thus, the direct reaction of phosphoric acid and glycol is possible: see, for example, Houben-Weyl, "Methoden der Organischen Chemie" [Methods of Organic Chemistry] 12/2: 144–148 [1964]. Also available is the reaction of aqueous phosphoric acid or polyphosphoric acid with ethylene oxide (Houben-Weyl, loc. cit., 307), as well as production by way of cyclic intermediate stages from phosphorus trichloride and glycol (Chem. Ber. 90: 801–814 [1957]). It is also possible to prepare the phosphorous acid esters in an analogous fashion. It is preferred that the acids be aqueous in this reaction. The ester-type products can be prepared first and subsequently the melamine reactant added. Also, all three component reactants can be reacted at the same time, in which case it is preferred that the melamine be added after the acid and ethylene oxide or glycol reactants have been added together.

The reaction of 0.1–100% strength phosphoric acid with 0.5–2 moles of ethylene oxide at temperatures of 10°–90° C. is preferred, wherein particularly an approximately 85% strength phosphoric acid is allowed to react at 25° C. with 1–1.25 moles of ethylene oxide (per mole of H₃PO₄).

The melamine reactant is then added thereto or the reaction product is combined with an aqueous melamine suspension (0.2–1 mole per mole of H₃PO₄) or a hot (50°–100° C.) aqueous melamine solution, both aqueous. Thereafter, the reaction ensues while the solution is being evaporated to dryness (generally at a temperature of 50°–150° C., until complete, generally after 1 hour) under constant agitation or blending, optionally under vacuum. The obtained product is dried and tempered at temperatures of 100° to 250° C., preferably 160°–200° C., for heating times of 1–10 hours, preferably 2–3 hours.

In addition to using glycol and ethylene oxide, it is also possible to coreact a $C_3$-non-cyclic organic compound containing at least 2 or 3 hydroxy groups or their equivalent (e.g., an epoxy group), propylene glycol, 1,3-propanediol, propylene oxide, glycerin, glycidol, epichlorohydrin, etc. with the phosphoric acid, polyphosphoric acid, or phosphorous acid, preferably in proportions of 1–50 molar percent, based on the amount of glycol and/or ethylene oxide used.

As the nitrogen compound, 0.2–1 mole of melamine per mole of phosphoric or other acid is preferably utilized. Optimum properties result with 0.4–0.8 mole, especially about 0.6 mole of melamine. However, it is also possible to utilize other nitrogen compounds in a mixture with melamine. Examples in this connection include urea, dicyandiamide, methylurea, guanylurea, thiourea, guanylthiourea, phenylenediamine, piperazine, diethyltriamine, melamine aldehyde resin, polyamide, polyurethane or polyisocyanurate, etc. These compounds are used, if desired, in amounts of up to 80 molar percent, e.g., 1–80 molar percent, perferably up to 50 molar percent, based on the amount of melamine employed.

The production of flameproofed thermoplastics is accomplished according to conventional methods by mixing and shaping in extruders, masticators, rolls and/or presses at above the softening temperature of the polymers. Depending on the degree of flameproofness desired, 5–60% by weight of the flame retardant, based on the weight of the total mixture, is utilized. A preferred range is at 20–30% by weight. A combination with other flame retardants, e.g., with halogen compounds, especially chlorinated polyolefins or paraffins, with phosphorous compounds, antimony oxide, aluminum trihydrate, boron compounds, etc., can also be advantageous.

The use of the customary synthetic resin adjuvants or fillers, such as stabilizers, mold-release agents, dyes, pigments, plasticizers, glass fibers, etc., in the conventional amounts, is likewise conventionally possible.

The intumescent flame retardants of this invention are effective in very diverse synthetic resins by the formation of the flame-shielding coke layer. It is particularly possible to render flame-retardant, in the way described above, thermoplastic polymers such as polypropylene, polyethylene, polybutene, polystyrene, copolymers of styrene, polyvinyl chloride, polyethylene terephthalate, polybutyleneterephthalate, polyamide, etc. The preferred synthetic resin is a flameproofed polypropylene combined with 20–30% by weight of the phosphoric acid-ethylene oxide-melamine product.

An advance in the art is attained by the improved efficacy of the noval flame retardants of this invention, based on the quantities in which they are utilized, as well as by the optical appearance of the thus-treated polymers, which have a pure white, pigment-free look.

To test the flame-retardant properties of the synthetic resins of this invention, the oxygen index of ASTM D-2863, as well as the flammability test of Underwriters Laboratories, USA "UL-94" can be suitably employed.

To determine the oxygen index (LOI), a small rod having the dimensions 150×6×3 mm, disposed vertically in a glass cylinder, is ignited at varying $N_2/O_2$ mixtures at the upper end in order to determine the $O_2$ concentration (in % by volume) at which the sample is just barely burning. An LOI of 20.9, thus, means that the specimen is just burning in a normal atmosphere, but is extinguished at a lower $O_2$ content, for example, at 20.5% $O_2$.

The UL-94 test utilizes test specimens having the dimensions 125×12.7×3 mm. These specimens are clamped vertically in place and twice ignited from below for 10 seconds with a 20 mm Bunsen burner flame. Thereafter the average afterburning time and the formation of burning polymer droplets are evaluated as follows:

| Grading | Average After-burning Time | Burning Droplets |
| --- | --- | --- |
| V–0 | <5 sec | no |
| V–1 | <25 sec | no |
| V–2 | <25 sec | yes |
| not graded | <25 sec | — |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

At 20°–25° C., under slight cooling, 132 g (3 moles) of ethylene oxide is introduced into an agitated flask containing 351 g (3 moles) of 85% strength phosphoric acid. The mixture is diluted with 500 ml of water and combined under agitation with 228 g (1.8 moles) of melamine. Under constant blending—best done with the use of a forced circulation evaporator—the water is distilled off, heating the thus-separated solid product toward the end to about 180° C. After discharging the solid from the flask, the white product is ground or pulverized, thus obtaining 594 g having the following composition (product 1):

20.2% C; 4.85% H; 25.3% N; 14.2% P.

EXAMPLE 1a

The procedure of Example 1 is followed, but using, instead of 3 moles of ethylene oxide, 1.5 moles of ethylene oxide and 1 mole of 2,3-epoxypropanol (glycidol), thus obtaining product 1a.

EXAMPLE 1b

The procedure of Example 1 is followed, but using, instead of 1.8 moles of melamine, a mixture of 1 mole of melamine and 3 moles of urea, thus obtaining product 1b.

EXAMPLE 2

Under agitation, 44 g (1 mole) of ethylene oxide is introduced at room temperature into 164 g (1 mole) of 50% phosphorous acid and 700 ml of water. The mixture is stirred for about 15 minutes and then 76 g (0.6 mole) of melamine is added thereto. When heating the mixture to 70° C., complete dissolution occurs. The water is distilled off from the reaction mixture by means of a forced circulation evaporator, and the product is heated to a final temperature of 190° C. Residue: 179 g of a white solid product (product 2).

Analysis: 20.9% C; 4.55% H; 27.1% N; 16.7% P.

EXAMPLE 3

The products from processing Examples 1-2 are worked up on a roll at 180° C. for 20 minutes in polypropylene ("VESTOLEN" P 6200), and the compositions are pressed into panels having a thickness of 3 mm. Rods having the dimensions 150×6×3 mm (LOI) and 125×12.7×3 mm (UL-94) are sawed off from this panel and tested according to the above-mentioned flammability tests.

| Product | Amount | LOI | UL-94 |
|---|---|---|---|
| 1 | 20% by wt | 28.0 | — |
| 1 | 30% by wt | 30.0 | V-0 |
| 1a | 20% by wt | 26.5 | — |
| 1b | 20% by wt | 26.0 | — |
| 2 | 20% by wt | 29.5 | — |
| 2 | 30% by wt | 31.0 | V—0 |
| For Comparison | | | |
| Pure "VESTOLEN" P 6200 | — | 17.5 | not graded |
| Comparison Mixture (+) | 20% by wt | 22.5 | not graded |

(+) Amonium polyphosphate:melamine:pentaerythritol = 3:1:1(DOS 2,704,897, Example 1 or DOS 2,704,274, Example 2)

EXAMPLE 4

The product of Example 1 is incorporated at 20-40% by weight into various polymers. Testing according to ASTM D-2863 (oxygen index) leads to the following results:

| Polymer | LOI without Flame Retardant | Added Amount of Product 1 | LOI with Product 1 |
|---|---|---|---|
| Polyethylene | 17.5 | 40% by wt | 25.0 |
| Polystyrene | 18.2 | 30% by wt | 22.5 |
| Polyvinyl chloride | 42.5 | 30% by wt | 49.0 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flame-retardant composition comprising a thermoplastic synthetic resin and an intumescent phosphorous-containing flame retardant prepared by the process comprising evaporating to dryness the reaction product of (a) 1 mole of phosphorous acid, phosphoric acid or polyphosphoric acid, (b) 0.5-2 moles of ethylene oxide or ethylene glycol, and (c) 0.2-1 mole of melamine, and tempering the thus-obtained solid at 100°-250° C.

2. The flame-retardant composition of claim 1 wherein the process comprises
   reacting (a) 1 mole of phosphoric acid, phosphorous acid or polyphosphoric acid, (b) 0.5-2 moles of ethylene oxide or glycol, and (c) 0.2-1 mole of melamine;
   evaporing to dryness the product so-produced; and tempering the thus-obtained solid at 100°-250° C.

3. The flame-retardant composition of claim 1 wherein the tempering is at 160°-200° C.

4. The flame-retardant composition of claim 1 wherein there is also reacted 1-50 mole percent, based on the amount of ethylene glycol or ethylene oxide, of a propane substituted by 2 or 3 OH groups, by an epoxy group, or by an OH group and an epoxy group.

5. The flame-retardant composition of claim 1 wherein there is also reacted 1-80 molar percent, based on the amount of melamine employed, of urea, dicyandiamide, methylurea, guanylurea, thiourea, guanylthiourea, phenylenediamine, piperazine, diethyltriamine, melamine aldehyde resin, polyamide, polyurethane or polyisocyanurate, etc.

6. The flame-retardant composition of claim 1, containing 5-60% by weight of the total mixture of the flame-retardant product.

7. The flame-retardant composition of claim 6, wherein the synthetic resin is polypropylene.

* * * * *